United States Patent
Zabarsky et al.

[11] Patent Number: 6,115,830
[45] Date of Patent: Sep. 5, 2000

[54] FAILURE RECOVERY FOR PROCESS RELATIONSHIPS IN A SINGLE SYSTEM IMAGE ENVIRONMENT

[75] Inventors: Jeffrey A. Zabarsky, Playa Del Rey; Bruce J. Walker, Rolling Hills Estates, both of Calif.

[73] Assignee: Compaq Computer Corporation, Houston, Tex.

[21] Appl. No.: 09/050,226

[22] Filed: Mar. 28, 1998

Related U.S. Application Data

[60] Provisional application No. 60/066,012, Nov. 11, 1997.

[51] Int. Cl.[7] .............................. H02H 3/05; G06F 17/30
[52] U.S. Cl. ................................... 714/15; 714/23; 707/2
[58] Field of Search .................................. 714/15, 18, 20, 714/4, 23; 707/2, 102; 705/54

[56] References Cited

U.S. PATENT DOCUMENTS

| | | | |
|---|---|---|---|
| 5,276,872 | 1/1994 | Lomet et al. | 395/600 |
| 5,333,254 | 7/1994 | Robertson | 395/155 |
| 5,333,303 | 7/1994 | Mohan | 395/575 |
| 5,432,926 | 7/1995 | Citron et al. | 395/575 |
| 5,530,800 | 6/1996 | Larsson et al. | 395/181 |
| 5,649,135 | 7/1997 | Pechanek | 395/396 |
| 5,802,367 | 9/1998 | Held et al. | 395/685 |
| 5,940,832 | 8/1999 | Hamada et al. | 707/100 |
| 5,970,496 | 10/1999 | Katzenberger | 707/102 |

*Primary Examiner*—Norman M. Wright
*Attorney, Agent, or Firm*—Fenwick & West LLP

[57] ABSTRACT

A system for recovery of process relationships following node failure within a computer cluster is provided. For relationship recovery, each node maintains set of care relationships. Each relationship is of the form carer cares about care target. Care relationships describe process relations such as parent-child or group leader-group member. Care relationships are stored at the origin node of their care targets. Following node failure, a surrogate origin node is selected. The surviving nodes then cooperate to rebuild vproc structures and care relationships for the processes that originated at the failed node at the surrogate origin node. The surviving nodes then determine which of their own care targets were terminated by the node failure. For each terminated care targets, notifications are sent to the appropriate carers. This allows surviving processes to correctly recover from severed process relationships.

15 Claims, 5 Drawing Sheets

FAILURE RECOVERY FOR PROCESS RELATIONSHIPS IN A SINGLE SYSTEM IMAGE ENVIRONMENT

RELATED APPLICATIONS

The following application claims the benefit of U.S. Provisional Application Serial No. 60/066,012 entitled "Filesystem Failover in a Single System Image Environment" by Bruce Walker, filed Nov. 11, 1997, the disclosure of which is incorporated in this document by reference.

FIELD OF THE INVENTION

The present invention relates generally to techniques for increasing the availability of computer clusters. More specifically, the present invention includes a system for performing failure recovery for process relationships in a computer cluster.

BACKGROUND OF THE INVENTION

Computer clusters are an increasingly popular alternative to more traditional computer architectures. A computer cluster is a collection of individual computers (known as nodes) that are interconnected to provide a single computing system. The use of a collection of nodes has a number of advantages over more traditional computer architectures. One easily appreciated advantage is the fact that nodes within a computer cluster may fail individually. As a result, in the event of a node failure, the majority of nodes within a computer cluster survive in an operational state. This has made the use of computer clusters especially popular in environments where continuous availability is required.

Single system image (SSI) clusters are a special type of computer cluster. SSI clusters are configured to provide programs (and programmers) with a unified environment in which the individual nodes cooperate to present a single computer system. Resources, such as filesystems, are made transparently available to all of the nodes included in an SSI cluster. As a result, programs in SSI clusters are provided with the same execution environment regardless of their physical location within the computer cluster. SSI clusters increase the effectiveness of computer clusters by allowing programs (and programmers) to ignore many of the details of cluster operation. Compared to other types of computer clusters, SSI clusters offer superior scaleability (the ability to incrementally increase the power of the computing system), and manageability (the ability to easily configure and control the computing system). At the same time, SSI clusters retain the high availability of more traditional computer cluster types.

The ability of computer clusters to survive node failure does not mean that these failures have no effect. Instead, it is generally the case that each node failure will have a number of undesirable consequences. One of these consequences is the termination of each process executing at a failed node. Loss of a node may also have a much wider effect. For example, in some cluster types, failure of a node will result in termination of all processes that originated at, and later migrated from, the failed node.

Another undesirable consequence of node failure is severance of process relationships. Process relationships are a way in which different processes interact. In UNIX® and UNIX-like environments, processes relationships include parent-child relationships, process groups, and sessions. In general, failure of any node within a computer cluster will result in the loss of a number of processes, severing a number of process relationships. Each severed relationship must be rebuilt or cleaned up following node failure.

The undesirable consequences of node failure makes effective failure recovery an indispensable component of computer clusters. To be effective, failure recovery must minimize the number of processes terminated during a node failure. Thus, it is important to provide a mechanism for preserving processes that have migrated from a failed node. Effective failure recovery must also provide a mechanism for rebuilding severed process relationships.

One potential strategy for performing failure recovery is to have the nodes included in a computer cluster perform global reconciliation following each node failure. During global reconciliation, the nodes exchange a series of messages. The messages allow the nodes to determine the effect of the node failure on the processes surviving within the computer cluster. The nodes may then take action, such as rebuilding process relationships, to minimize the effect of the node failure. Unfortunately, practice has shown global reconciliation to be extremely message intensive. Worse, the number of messages required tends to grow geometrically with the number of nodes included in the computer cluster. This limits the use of global reconciliation to small computer clusters that include only a small number of nodes.

A second potential strategy for performing failure recovery is to have each process included in a process relationship reliably track the location of all other processes included in the relationship. This allows reconciliation to be performed with a minimal number of intra-node messages. Unfortunately, this type of tracking involves a substantial runtime penalty each time a process migrates between nodes within a computer cluster. This runtime penalty makes the use of this tracking strategy impractical within most computer clusters.

Based on the preceding paragraphs, it is clear that there is a need for failure recovery techniques for computer clusters. These failure recovery techniques must minimize the number of processes terminated by node failure and reconstruct processes relationships severed by node failure. Failure recovery must also be performed with a limited number of intra-node messages and without incurring a substantial runtime penalty during normal operation of the computer cluster.

SUMMARY OF THE INVENTION

An embodiment of the present invention includes a system for failure recovery for process relationships in an SSI cluster. A representative environment for the present invention includes an SSI computer cluster. The SSI computer cluster includes a series of individual computer systems referred to as nodes. The nodes of the SSI computer cluster operate under control of UNIX® or UNIX-like operating systems.

For the purposes of present invention, a process or node (known as a carer) cares about another process or node (known as a care target) when they are participants in selected types of relationships. For example, a child process cares about its parent process. Parent process also care about their child processes. For the parent/child relationship, parent and child processes are both carers and care targets. In general, the care abstraction may be used to describe a wide range of relationships. For the described embodiment of the present invention, these relationships include: foster parent/child, process group leader/process group members, process session leader/process session members, controlling terminal node/process session leader, controlling terminal node/foreground process group and /proc process entry and process (for systems that implement/proc).

Within the SSI cluster, each process has an origin node. The origin node of a process is the node that created the process. A set of care relationships are maintained for each process by the origin node of the process. The set of care relationships for a process list all processes or nodes that care about the process. Care relationships are dynamically updated as relationships within the SSI cluster change. For example, in the UNIX® environment provided by the SSI cluster, processes become children of the init process if they are predeceased by their parents. The care relationships of a child process are updated to reflect this event by removing the parent cares about child entry and adding an init cares about child entry.

In the event of node failure, a surrogate origin node is designated for the failed node. The SSI cluster then rebuilds the vproc structures and care lists that had been maintained at the failed node on the surrogate origin node. To rebuild vproc structures and care lists, each node in the SSI cluster examines its resident processes. During this examination, each node looks for two kinds of processes. The first kind are processes whose origin node was the failed node. The second kind are processes that have care relationships to processes whose origin node was the failed node. Each node uses the results of its examination to construct a slave information list. Each slave information list includes process descriptions that describe processes of the first kind. Each slave information list also include care relations that describe processes of the second kind and their relationships to the failed node. For each included care relationship, a flag is set that indicates whether the care target is known to exist within the node generating the list.

The nodes within the SSI cluster send their slave information lists to the surrogate origin node. The surrogate origin node creates vproc structures for the process descriptions and the care targets included in the received slave information lists. The surrogate origin node initializes the created vproc structures to reflect the care relationships included in the received slave information lists. Vproc structures that are created for processes killed during node failure are marked as ghost processes. Vproc structures created for processes that survived node failure are initialized to reflect the current location of their processes. If the group of session leader was lost, the leader is reconstructed at the surrogate origin node. The initialization process also updates the created vproc structures to reflect the current locations of their associated group and session leaders, if these locations are known.

After sending their slave information lists, the nodes within the SSI cluster initiate cleanup of the care relationships severed by the node failure. As part of this cleanup, each node examines each of the care relationships stored within that node. During this examination, each node looks for care targets that originated at that node and were killed during node failure. Notifications are sent by the examining node to processes and nodes that care about killed care targets.

The notifications sent during the cleanup process allow the receiving processes and nodes to recover from the loss of the killed care targets. For example, in the case where a parent process looses a child process, the origin node of the child process will send a notification to the origin node of the parent process. The parent process is then informed that the child process in now a ghost process. Similarly, in cases where a child process looses its parent process a notification is sent by the origin node of the parent process to the origin node of the child process. The child is then reassigned as a child of the INIT process. Other recovery steps are performed for severed foster-parent cares about foster-child, foster child cares about foster-parent, process group leader cares about process group member, process session leader cares about process session member, controlling terminal node cares about foreground process group and /proc entry node cares about process relationships.

In this way, the present invention provides an efficient system that allows the SSI cluster to rebuild vproc structures and cleanup severed care relationships following node failure.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
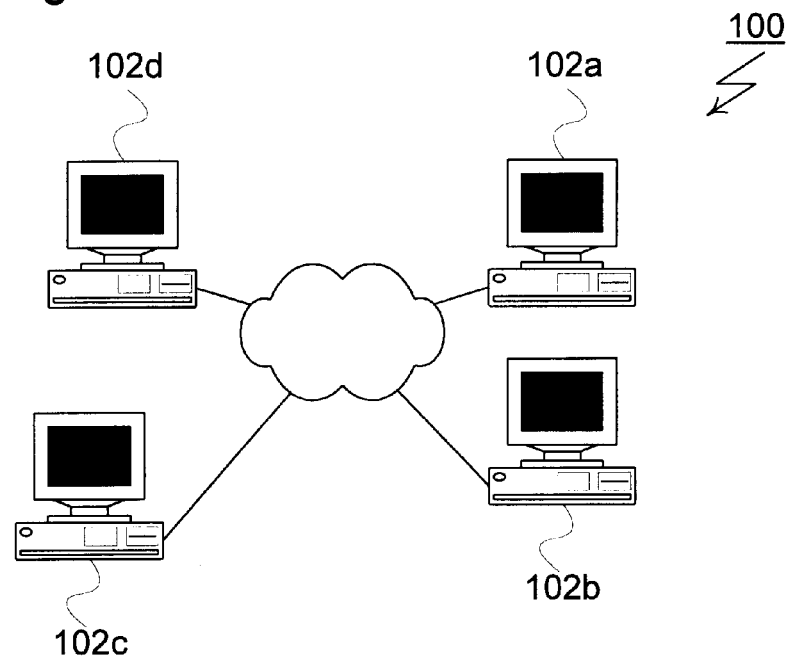
FIG. 1 is a block diagram of a computer cluster shown as an exemplary environment for an embodiment of the present invention.

In FIG. 1, an SSI computer cluster is shown as a representative environment for the present invention and is generally designated 100. SSI computer cluster 100 includes a series of computer systems referred to as nodes, of which nodes 102a through 102d are representative. Nodes 102 are intended to be representative of an extremely wide range of computer system types including personal computers, workstations and mainframes. SSI computer cluster 100 may include any positive number of nodes 102. Preferably, nodes 102 are configured to provide a single system image, and operate under control of a UNIX® or UNIX-like operating system.

CARE RELATIONSHIPS

Figure 2:
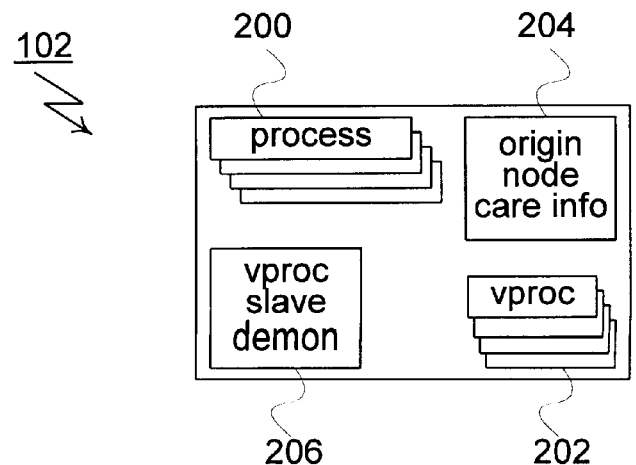
FIG. 2 is a block diagram showing the software components included within a representative node as used within an embodiment of the present invention.

As shown in FIG. 2, each node 102 within SSI cluster 100 may include a series of processes 200. Processes 200 are preferably allowed to migrate within SSI cluster 100. As a result, the processes 200 that are included within a specific node 102 may, or may not, have been created by that node 102. The node 102 that creates a process 200 is known as the origin node 102 for that process.

Each node 102 includes a separate vproc structure 202 for each process that originated at that node 102. Each vproc structure 200 is a data structure that provides an abstract interface to its associated process 200. SSI cluster 100 uses vproc structures 202 to manage processes 200.

Each node 102 also includes an origin node care information data structure 204. The origin node care information data structure 204 included within a node 102 includes a set of care relationships for the processes 200 for that originated at that node 102. The relations included in origin node care information data structures 204 will be more fully described in later portions of this document.

Nodes 102 also include respective vproc slave daemons 206. Vproc slave daemons 206 are used by SSI cluster 100 to gather information about vproc structures 202 and origin node care information data structures 204.

For the purposes of present invention, a process 200 or node 102 (known as a carer) cares about another process 200 or node 102 (known as a care target) when they participate in selected types of relationships. For example, a child process 200 cares about its parent process 200. Parent processes 200 also care about their child processes 200. For the parent/child relationship, parent and child processes 200 are both carers and care targets. In general, the care abstraction may be used to describe a wide range of relationships. For the described embodiment of the present invention, these relationships include: foster parent/child, process group leader/process group members, process session leader/process session members, controlling terminal node/process session leader, controlling terminal node/foreground process group and /proc process entry and process (for systems that implement /proc).

Figure 3:
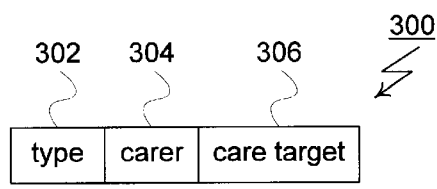
FIG. 3 is a block diagram of a care relationship data structure as used by an embodiment of the present invention.

The origin node care information data structure 204 included within each node 102 includes a set of care relationships of the form shown in FIG. 3 and is generally designated 300. Each care relationship 300 includes a type field 302, a carer field 304 and a care target field 306. Type field 302 defines the type (e.g., parent-child, child-parent) of relationship being defined by a particular care relationship 300. Carer 304 and care target 306 define the node 102 or process 200 that participates as a carer or care targets in a particular relationship. Type field 302 may also include one or more flags. The flags indicate whether the care target 306 of a care relationship 300 is known to be alive. The flags also indicate whether the process group leader or session leader of the care target 306 is known to be alive.

Each node 102 stores a complete set of care relationships 300 for the processes 200 that originated at that node 102. These care relationships are stored in origin node care information data structure 204 of each node 102. Care relationships 300 are dynamically updated as relationships within SSI cluster 100 change. For example, in UNIX® environments, processes 200 become children of an init process 200 if they are predeceased by their parents. The care relationships 300 of a child process 200 are updated to reflect this event by removing the parent cares about child care relationship 300 and adding an init cares about child care relationship 300.

Failure Recovery Overview

Figure 4:
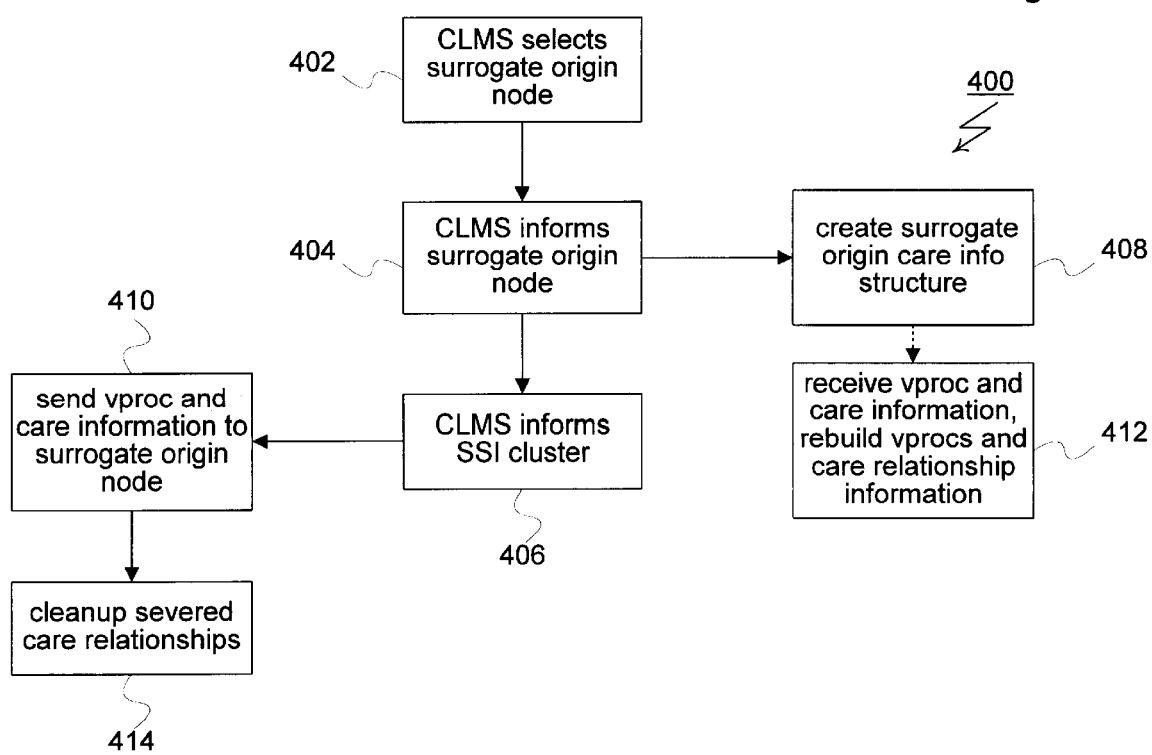
FIG. 4 is a flowchart showing the steps associated with a method for recovery of process relationships as used by an embodiment of the present invention.

A method for recovery of process relationships after failure of one or more nodes 102 is shown in FIG. 4 and is generally designated 400. Recovery method 400 is initiated when SSI cluster 100 detects that a node 102 has failed. Upon detection of failure, a process known as a cluster membership service, or CLMS, selects a node 102 that will act as a surrogate origin node 102 for the failed node (see step 402). In general, CLMS is free to select any node 102 to be the surrogate origin node 102 (with the exception of the failed node). For the described embodiment, it is assumed that CLMS selects its own host node 102.

After selecting a surrogate origin node 102, CLMS sends two messages. The first message is sent by CLMS to the selected node 102 informing it that it will be the surrogate origin node 102 (see step 404). The second message is sent by CLMS to the vproc slave daemons 206 within nodes 102 (see step 406). The second message informs the vproc slave daemons 206 that a node failure has occurred and identifies the selected surrogate node 102.

Surrogate node 102 responds to the first message by creating a secondary origin node care information data structure 204 (see step 408). The secondary origin node care information data structure 204 is maintained separately from the origin node care information data structure 204 maintained by the surrogate origin node 102. This allows surrogate origin node 102 to separate care relationships 300 that are normally included within surrogate origin node 102 from those that will be stored there as part of process relationship recovery.

Vproc slave daemons 206 respond to the second message by generating and sending slave information lists to surrogate origin node 102 (see step 410). Each vproc slave daemon 206 generates its slave information list by examining the processes 200 that are local to its node 102. Each list includes information that identifies local processes that originated at the failed node 102. Each list includes information that identifies the care relationships 300 that local processes have to processes that originated at the failed node 102. Generation and sending of slave information lists will be more fully described in later portions of this document.

Surrogate origin node 102 receives the slave information lists sent by vproc slave daemons 206 (see step 412). The lists allow surrogate origin node 102 to create vproc structures 202 and care relationships 300 to replace the vproc structures 202 and care relationships 300 lost during node failure. At the completion of step 412, surrogate origin node 102 functions as the host for all vproc structures 202 that were originally included in the failed node 102. All vproc structure operations intended for these vproc structures 202 are redirected to surrogate origin node 102. Recreation of vproc structures 202 and care relationships 300 will be more fully described in later portions of this document.

After sending their slave information lists, vproc slave daemons 206 perform cleanup of severed care relationships (see step 416). During cleanup, each vproc slave daemon examines each of the care relationships 300 stored within its node 102. During this examination, each vproc slave daemon 206 looks for care targets 306 that originated at the failed node 102 and were killed during node failure. For each care relationship 300 of this type that is detected, the examining vproc slave daemon 206 sends a notification message to the process 200 or node 102 that cares about the killed care target 306 (i.e., the carer 304 included in the care relationship 300).

The notifications sent during cleanup allow the receiving processes 200 and nodes 102 to recover from the loss of killed care targets 306. For example, in the case where a parent process 200 looses a child process 200, the origin node 102 of the child process 200 will send a notification to the origin node 102 of the parent process 200. The parent process 200 is then informed that the child process 200 has been terminated by node failure. Similarly, in cases where a child process 200 looses its parent process 200, a notification is sent by the origin node 102 of the parent process 200 to the origin node 102 of the child process 200. The child process 200 is then reassigned as a child of the INIT process 200. Other recovery steps are performed for severed foster-parent cares about foster-child, foster child cares about foster-parent, process group leader cares about process group member, process session leader cares about process session member, controlling terminal node cares about foreground process group and /proc entry node cares about care relationships 300.

Generation of Slave Information Lists

Figure 5:
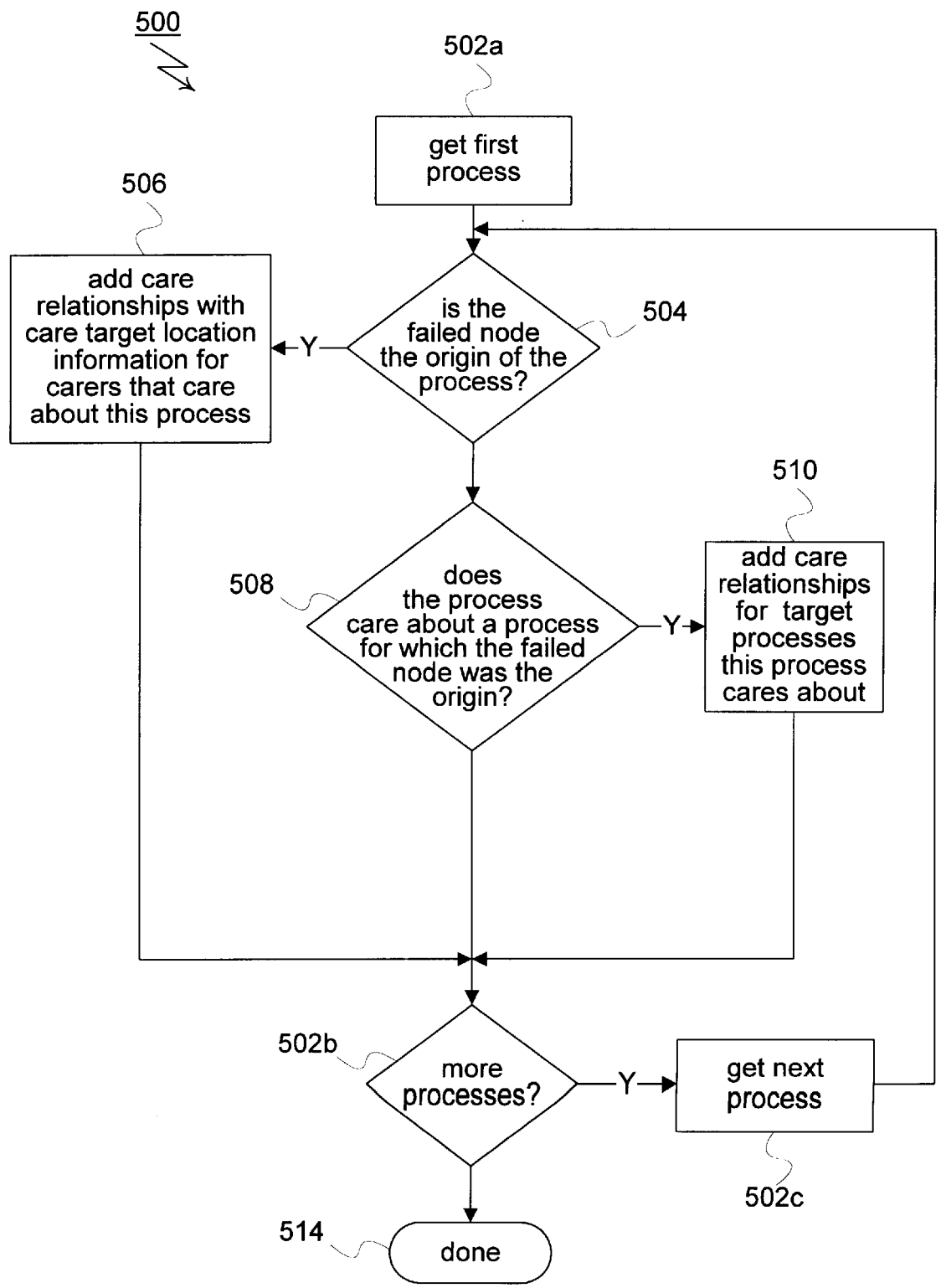
FIG. 5 is a flowchart showing the steps associated with a method for generating a slave information list as used by an embodiment of the present invention.

A method for generating a slave information list is shown in FIG. 5 and is generally designated 500. Method 500 is invoked by each vproc slave daemon 206 after being informed by CLMS that a node 102 within SSI cluster 100 has failed. To simplify the following description, method 500 is described in terms of the steps performed by a single vproc slave daemon 206, following receipt of a message of this type.

Structurally, method 500 includes an outer loop 502 that includes steps 502a, 502b and 502c. During execution of loop 502, vproc slave daemon 206 selects a first process 200 (see step 502a), tests to see if more processes remain to be processed (see step 502b) and selects a next process (see step 502c). Together, the steps of loop 502 provide a control structure that allows vproc slave daemon 206 to sequence through each of its local processes 200. It should be appreciated that other iterative control structures may be equally useful within the context of method 500.

Within loop 502, vproc slave daemon 206 examines the vproc structure 202 of the selected process 200 to determine if the failed node 102 is the origin node 102 of the selected process 200 (see step 504). Vproc slave daemon 206 makes this determination by examining the process identifier (PID) stored in the vproc structure 202 of the selected process 200. Within SSI cluster 100, process identifiers are extended so that the origin node 102 of each process is encoded in the upper bits of the PID. In step 504, vproc slave daemon 206 examines these upper bits to see if they correspond to the failed node 102. In the positive case, vproc slave daemon 206 continues method 500 by adding one or more care relationships 300 to a slave information list (see step 506). Each added care relationship 300 includes a carer 304 that is located within the node 102 on which vproc slave daemon is executing. The care target 306 of each added care relationship is the selected process 200.

As part of adding care relationships 300 to the slave information list, vproc slave daemon 206 marks each added care relationship 300 to indicate that the care target 300 (i.e., the selected process 200) is known to exist. Vproc slave daemon performs this marking by setting a flag included in the type field 302 of each added care relationship 300. The flag indicates that the existence of care target 306 has been verified. After setting flags in step 508, method 500 continues with the control structure of loop 502 (see step 502b).

In the case where the failed node 102 is not the origin node 102 of the selected process 200, vproc slave daemon 206 continues method 500 by determining if the selected process 200 cares about a process 200 that originated at that node 102 (see step 508). Vproc slave daemon 206 makes this determination by examining the vproc structure 202 of the selected process 200. The vproc structure 202 identifies the processes 200 that are the parent, children, process group leader and session leader of the selected process. If the PIDs of any of these processes indicate that they originated at the failed node, vproc slave daemon 206 determines that the selected process cares about a process 200 at the failed node.

In the negative case (i.e., where the selected process 200 does not care about a process that originated at the failed node 102), method 500 continues with the control structure of loop 502 (see step 502b). In the positive case (i.e., where the selected process 200 cares about a process that originated at the failed node 102), vproc slave daemon 206 adds a care relationship 300 to the slave information list (see step 510). The added care relationship 300 has a carer field 304 that reflects the identity of the selected process 200. The care target 306 reflects the identity of the process 200 that originated at the failed node 102. Type field 302 describes the type of care relationship 300 that exists between the selected process 200 and the process 200 that originated at the failed node 102. After adding care relationship 300, method 500 continues with the control structure of loop 502 (see step 502b).

Each vproc slave daemon 206 uses method 500 to examine its local processes 200. During this examination, each vproc slave daemon 206 generates a slave information list. These lists include information that describes each process 200 that is determined to have originated at the failed node 102. The lists also include care relationships 300 for each process 200 that cares about a process whose origin node 102 was the failed node 102. For each of these care relationships 300, information is stored within the lists that indicates whether the care target 306 of the care relationship is known to exist. As described with regard to FIG. 4, each vproc slave daemon 206 sends its slave information list to surrogate origin node 102.

Recreating VPROC Structures and Lost Care Relationships

Surrogate origin node 102 receives the slave information lists sent by vproc slave daemons 206 (see step 412 of FIG. 4). The received lists allow surrogate origin node 102 to create vproc structures 202 and care relationships 300 to replace the vproc structures 202 and care relationships 300 lost during node failure. In response to the first received list, surrogate origin node 102 creates a secondary origin node care information data structure 204. The secondary origin node care information data structure 204 is maintained separately from the origin node care information data structure 204 maintained by the surrogate origin node 102. This allows surrogate origin node 102 to separate care relationships 300 that are normally included within surrogate origin node 102 from those that will be stored there as part of process relationship recovery.

Figure 6:
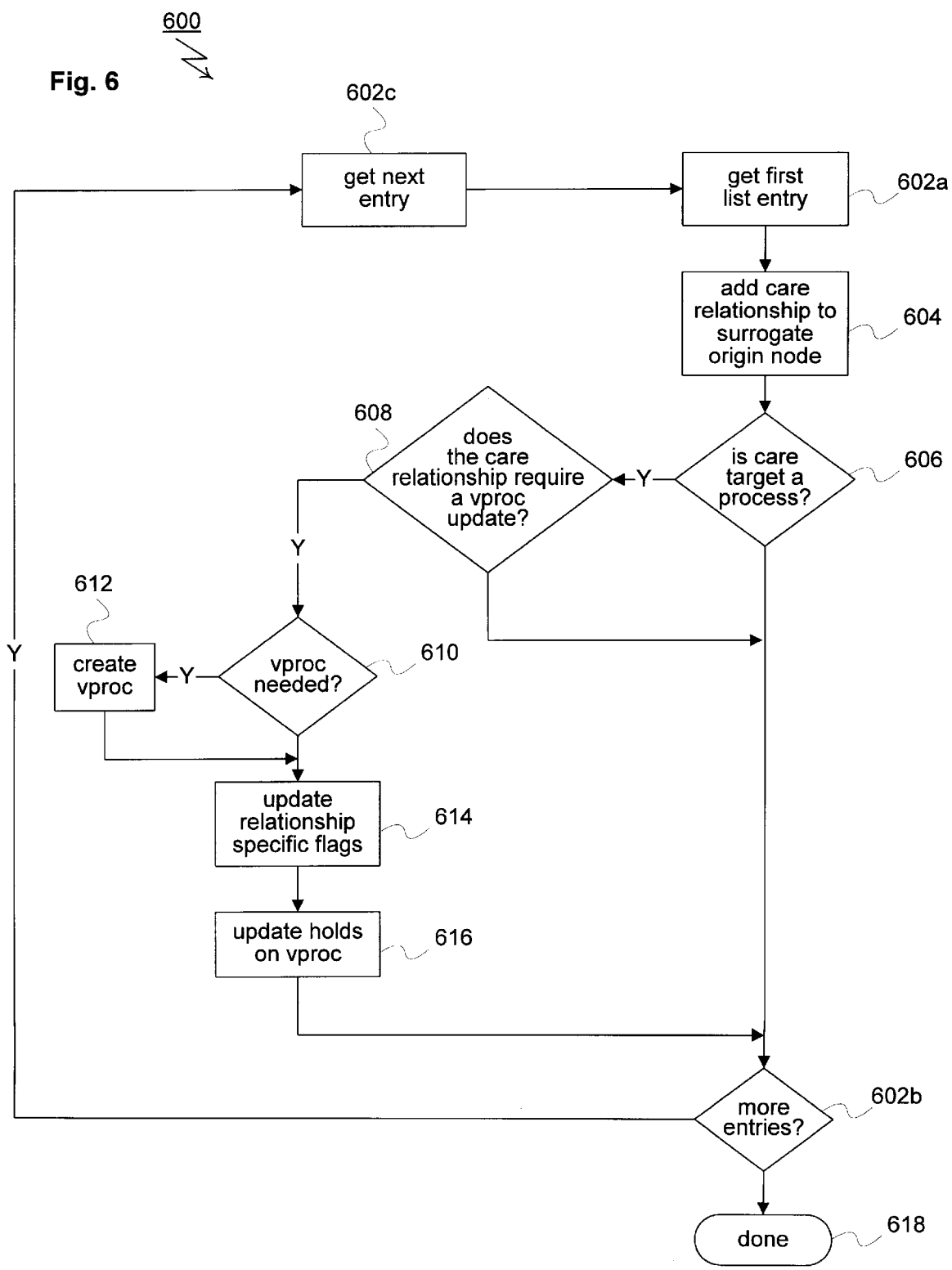
FIG. 6 is a flowchart showing the steps associated with a method for rebuilding vproc structures and care relationships as used by an embodiment of the present invention.

A method for processing the received lists is shown in FIG. 6 and is generally designated 600. Method 600 is invoked by surrogate origin node 102 each time a slave information list is received from a vproc slave daemon 206.

Structurally, method 600 includes an outer loop 602 that includes steps 602a, 602b and 602c. During execution of loop 602, surrogate origin node 102 selects the first care relationship 300 within the received slave information list (see step 602a). Subsequently, surrogate origin node 102 tests to see if more list entries remain to be processed (see step 602b) and selects a next care relationship 300 (see step 602c). Together, the steps of loop 602 provide a control structure that allows surrogate origin node 102 to sequence through each of the entries included in the received slave information list. It should be appreciated that other iterative control structures may be equally useful within the context of method 600.

Within loop 602, surrogate origin node 102 adds the selected care relationship 300 to the secondary origin node care information data structure 204 (see step 604). Surrogate origin node 102 then examines the selected care relationship 300 to determine if the included care target 306 references a process 200 (see step 606). In the negative case (i.e., where the object referenced by care target 306 is not a process 200) surrogate origin node 102 continue method 600 with another iteration of loop 602.

If surrogate origin node 102 determines that care target 306 references a process 200, surrogate origin node 102 determines if a vproc structure 202 associated with the selected care relationship 202 needs to be updated (see step 608). The vproc structure 202 needs to be updated if the selected care relationship 300 is one of the following types:

1) care relationships 300 of the form "parent cares about child" where the included care type 302 does not indicate that the included care target 306 is known to be alive.
2) care relationships of any form that indicate that the included care target 306 is known to be alive.
3) care relationships 300 of the form "group member cares about group leader," "session member cares about session leader," or "session leader cares about session member" where the flags included in care type 302 indicate that a process, group leader, or session leader is known to be alive.

In cases where surrogate origin node 102 concludes that the selected care relationship is not one of these types, surrogate origin node 102 continues method 600 with another iteration of loop 602. In the alternative, surrogate origin node 102 concludes that a vproc structure 202 with surrogate origin node 102 should be updated. The vproc structure 202 that requires updating depends on the type of the selected care relationship 300. For care relationships 300 of the type "session member cares about session leader" or "group member cares about group leader," the vproc structure 202 that requires updating is defined by the carer field 304 in the selected care relationship 300 (i.e., it is the group or session leader). In all other cases, the vproc structure 202 that requires updating is defined by the care target 306 in the selected care relationship 300. Surrogate origin node 102 continues method 600 by determining if the appropriate vproc structure 202 to be updated exists within the surrogate origin node 102 (see step 610). If the required vproc structure 202 does not exist, surrogate origin node 102 creates an appropriate vproc structure 202 (see step 612). As part of vproc creation, surrogate origin node places a hold on the new vproc structure 202. The hold prevents premature deallocation of the vproc structure 202.

Surrogate origin node 102 then updates flags within the vproc structure 202 to reflect the selected care relationship 300 (see step 614). Vproc structure 202 flags are updated according to the type of the selected care relationship 300 as follows:

1) In cases where the selected care relationship 300 is of the form "parent cares about child" surrogate origin node 102 determines if the included care target 306 is known to be alive. The included care target 306 is known to be alive if the type field 302 within the selected care relationship includes a flag indicating that the care target 306 is known to be alive. The included care target 306 is also known to be alive if the vproc structure 202 indicates that the care target 306 is known to be alive. If surrogate origin node 102 cannot determine that the care target 306 is known to exist, the vproc structure 202 is marked as a "ghost" process 200.
2) In cases where the selected care relationship 300 indicates that the included care target 306 is a process 200 known to be alive, surrogate origin node 102 remarks (if necessary) the vproc structure 202 to indicate that the process 200 is an origin for the still existing process 200. The ghost, if set is disabled in the origin vproc structure 202 of the process.
3) In cases where the selected care relationship 300 is of the form "group member cares about group leader" or "session member cares about session leader" surrogate origin node 102 determines if the included care target 306 is known to be alive. The included care target 306 is known to be alive if the type field 302 within the selected care relationship includes a flag indicating that the care target 306 is known to be alive. If the care target 306 is known to be alive, surrogate origin node 102 marks the vproc structure 202 as a group or session origin to indicate that the group or session leader is still alive. Surrogate origin node 102 also marks the vproc structure 202 to indicate the location of the group or session leader.
4) In cases where the selected care relationship 300 is of the form of the form "group leader cares about group member" or "session leader cares about session member" surrogate origin node 102 determines if the included carer 304 is known to be alive. The included carer 304 is known to be alive if the type field 302 within the selected care relationship includes a flag indicating that the process group leader or session leader is known to be alive. If the process group leader or session leader, surrogate origin node 102 marks the vproc structure 202 as a group or session origin to indicate that the group or session leader is still alive. Surrogate origin node 102 also marks the vproc structure 202 to indicate the location of the group or session leader.

In general, it should be appreciated that the type of updates and markings performed in the context of step 614 are highly dependent on the type of care relationships 300 that tracked within SSI cluster 100. Thus more, or fewer initializations may be performed for varying embodiments of the present invention.

After marking vproc structure 202, surrogate origin node 102 updates vproc structure 202 to include appropriate holds (see step 616). The holds reflect the fact the vproc structure 202 is a care target 306 of the selected relationship 300 and is origined at the surrogate node 102. The specific type of holds reflects the type of selected care relationship 300. Specifically, if the vproc structure 202 was marked as an origin or ghost process, an origin or ghost hold is placed on vproc structure 202. If the vproc was marked as a process group origin, a process group origin hold is placed on vproc structure 202. If the vproc was marked as a session origin, a session origin hold is placed on vproc structure 202. The hold placed on the newly created vproc structure (see step 612) is removed.

At the completion of method 600, surrogate origin node 102 functions as the host for all vproc structures 202 that were originally included in the failed node 102. All vproc structure operations intended for these vproc structures 202 are redirected to surrogate origin node 102.

Cleanup of Severed Process Relationships

Figure 7:
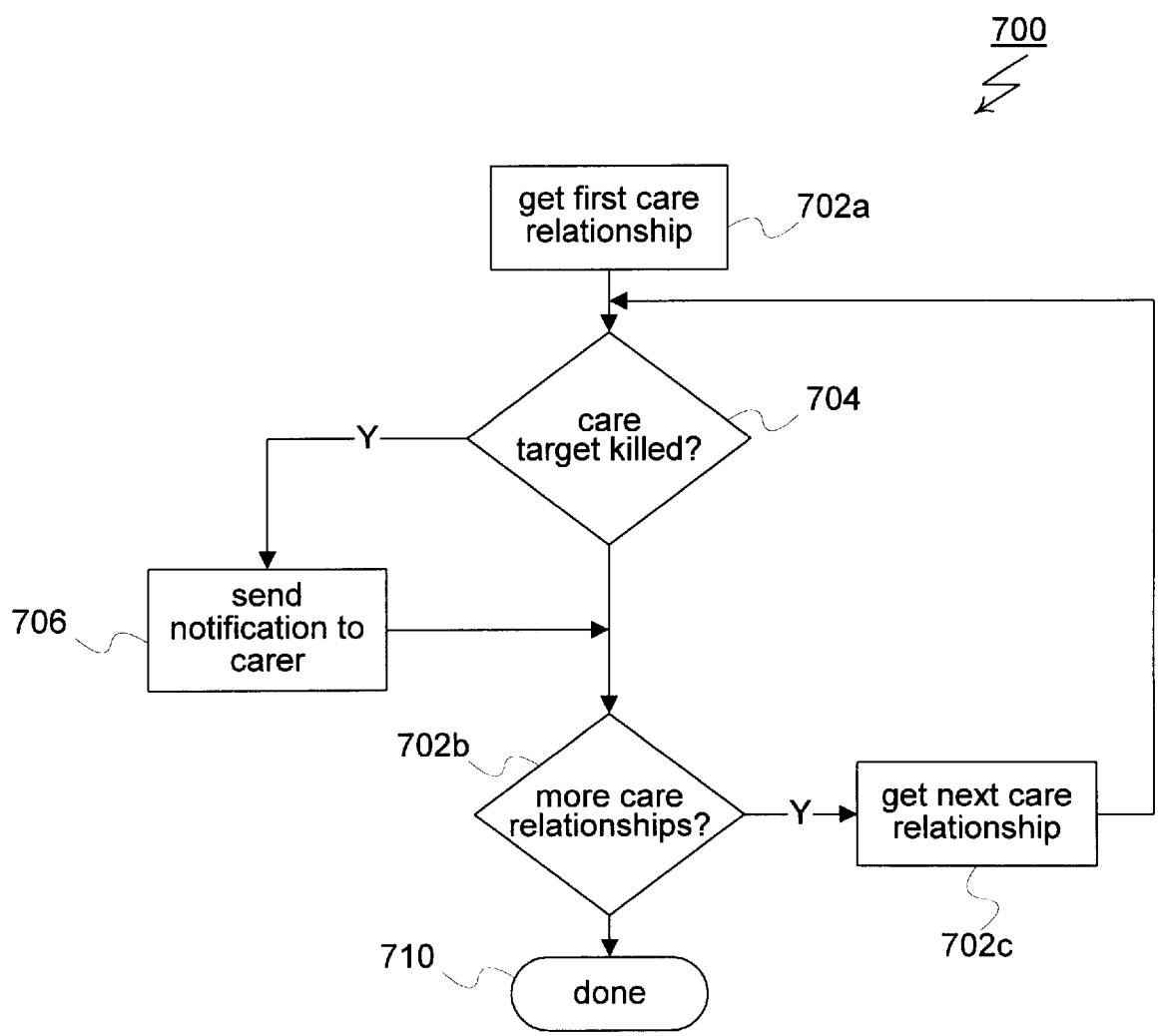
FIG. 7 is a flowchart showing the steps associated with a method for detection of servered care relationships as used by an embodiment of the present invention.

A method for detection and notification of severed care relationships is shown in FIG. 7 and is generally designated 700. Method 700 is invoked by each vproc slave daemon 206 after it has sent its slave information list. To simplify the following description, method 700 is described in terms of the steps performed by a single vproc slave daemon 206, after its slave information list has been sent.

Structurally, method 700 includes an outer loop 502 that includes steps 702*a*, 702*b* and 702*c*. During execution of loop 702, vproc slave daemon 206 selects a first care relationship (see step 702*a*), tests to see if more care relationships remain to be processed (see step 702*b*) and selects a next care relationship (see step 702*c*). Together, the steps of loop 702 provide a control structure that allows vproc slave daemon 206 to sequence through each of its local care relationships. It should be appreciated that other iterative control structures may be equally useful within the context of method 700.

Within loop 702, vproc slave daemon 206 examines the care target 306 of the selected care relationship 300. During this examination, vproc slave daemon 206 determines if the care target 306 originated at the failed node 102 (see step 704). If so, vproc slave daemon 206 checks to see if care target 306 survived the node failure (see step 706). In the negative case, vproc slave deamon 206 sends notification to the origin node 102 of the carer 304 included in the selected care relationship 300 (see step 708). In all other cases, method 700 continues with the control structure of loop 702 (see step 702*b*).

Each vproc slave daemon performs method 700 to detect care relationships 300 that have been severed by the termination of the failed node 102. During detection, vproc slave daemon 206 send notification of the severed care relationships 300 to the origin node 102 of the carers 304 involved in the servered care relationships 300.

The notifications sent by the vproc slave daemons 206 during execution of method 700 allow the receiving nodes 102 to recover from the loss of the killed care targets 306.

"Parent Cares About Child"

In the case where a parent loses a child, the child's origin node notifies the parent's origin node that the child was lost. The parent is informed that the child is in the "ghost" state.

"Child Cares About Parent"

When a child loses its parent, the parent's origin node notifies the child's origin node that the parent was lost. The child is then reassigned INIT as its parent.

"Foster-Parent Cares About Foster-Child"

In the case where a foster parent loses a foster child, the child's origin node notifies the foster parent's origin node that the foster child was lost. The foster child is removed from the foster parent's foster list.

"Foster-Child Cares About Foster-Parent"

When a foster child loses its foster parent, the foster parent's origin node notifies the foster child's origin node that the foster parent was lost. The foster child is then reassigned as a foster child of INIT.

"Process Group Leader Cares About Process Group Member"

When a process group member is lost, the process group member's origin node notifies the process group leader's origin node that the member was lost. The process group member is then removed from the leader's list.

"Process Session Leader Cares About Process Session Member"

Session members are process group leaders, which exist as long as process group members exist. A process group may still exist even if the leader itself is no longer an executing process. A session member (process group leader) is considered lost during a failure if the process group leader and all its members were lost. When a session member is lost, the session member's origin node notifies the session leader's origin node that the member was lost. The session member is removed from the leader's list.

"Controlling Terminal Node Cares About Foreground PROCESS GROUP"

The origin node of the controlling terminal's foreground process group tracks the care relationship. When the foreground process group is lost, the controlling terminal node is informed and the controlling terminal's foreground process group value is reset.

In addition, while performing cleanup, process groups are examined to determine if they are associated with a controlling terminal as a foreground process group. A SIGHUP signal is sent to an entire foreground process group if its controlling terminal is lost.

"/Proc Entry Node Cares About Process" (Only on Systems with/proc)

Each process has a /proc entry on a fixed node. The "entry cares about process" care relationship is tracked at the process origin. When the process is lost, the process origin node informs the entry node that the process was lost and the entry is cleaned up.

Nodes Rejoining The Cluster

In the case where a failed node 102 becomes able to rejoin SSI cluster 100 it is preferable for the rejoining node 102 to resume its role as origin node 102 for its former processes 200. In general, there are several different methods that may be used to transfer the care relationship information from the surrogate origin node 102 to the rejoining node 102. One way is for the surrogate node 102 to transfer, or push this information to the rejoining node 102. Another technique requires the surrogate origin node 102 to delete its origin node care information data structure 204. Care relationship information is then rebuilt on the rejoining nodes using methods 500 and 600.

Loss of Surrogate Origin Node

It is possible for a surrogate origin node 102 to fail while its is actively serving as the surrogate origin node. To recover from the loss of a surrogate origin node 102, CLMS selects a new surrogate origin node 102. The recovery techniques used to recover from the loss of an origin node 102 (i.e., methods 400, 500 and 600) are then used to rebuild the required care information and clean up severed care relationships. In this case, however, each of these methods is extended to perform each of its steps for a list of all nodes 102 that have been previously up and are currently down (i.e., the original origin node 102 and for all nodes for which is was acting as surrogate origin node 102).

CONCLUSION

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for recovery of process relationships after failure of a node within a computer cluster, the method comprising the steps of:
   selecting, by a cluster management service process, a surrogate origin node;
   generating, by a slave daemon, a list of care relationships, each care relationship involving a process that originated at the failed node;
   sending by the slave daemon, the list of care relationships to the surrogate origin node;
   receiving by the surrogate origin node, the list of care relationships; and
   reconstructing, by the surrogate origin node, a complete set of care relationships for processes that originated at the failed node.

2. A method as recited in claim 1 wherein the step of generating, by the slave daemon, further comprises the steps, performed by the slave daemon, of:
   detecting processes that originated at the failed node; and
   detecting processes having care relationships to processes that originated at the failed node.

3. A method as recited in claim 1 further comprising the steps of:
   detecting, by the slave daemon, processes that were terminated by the failure of the failed node; and
   sending, by the slave daemon, messages to the processes and nodes having care relationships to the processes that were terminated by the failure of the failed node.

4. A method as recited in claim 1 further comprising the step, performed by the surrogate origin node, of creating a vproc structure for each process that originated at the failed node.

5. A method as recited in claim 4 further comprising the step, performed by the surrogate origin node, of marking vproc structures created for processes terminated by the failure of the failed node as ghosts.

6. A system for recovery of process relationships after failure of a node within a computer cluster, the system comprising the steps of:
   a cluster management service process configured to select a surrogate origin node to substitute for the failed node;
   a slave daemon configured to generate a list of care relationships, each care relationship involving a process that originated at the failed node, the slave daemon also configured to send the list of care relationships to the surrogate origin node; and
   a rebuilding process configure to receive the list of care relationships and to reconstruct a complete set of care relationships for processes that originated at the failed node.

7. A system as recited in claim 6 wherein the slave daemon is further configured to detect processes that originated at the failed node and detect processes having care relationships to processes that originated at the failed node.

8. A system as recited in claim 6 wherein the slave daemon is further configured to detect processes that were terminated by the failure of the failed node, and send messages to the processes and nodes having care relationships to the processes that were terminated by the failure of the failed node.

9. A system as recited in claim 6 wherein the rebuilding process is further configured to create a vproc structure for each process that originated at the failed node.

10. A system as recited in claim 6 wherein the rebuilding process is further configured to mark vproc structures created for processes terminated by the failure of the failed node as ghosts.

11. A computer program product comprising:
    a computer usable medium having computer readable code embodied therein for recovery of process relationships after failure of a node within a computer cluster, the computer program product comprising:
       first computer readable program code devices configured to cause a computer system to select a surrogate origin node to substitute for the failed node;
       second computer readable program code devices configured to cause a computer system to generate a list of care relationships, each care relationship involving a process that originated at the failed node;
       third computer readable program code devices configured to cause a computer system to send the list of care relationships to the surrogate origin node;
       fourth computer readable program code devices configured to cause a computer system to receive the list of care relationships; and
       fifth computer readable program code devices configured to cause a computer system to reconstruct a complete set of care relationships for processes that originated at the failed node.

12. A computer program product as recited in claim 11 wherein the second computer readable program code devices are configured to cause a computer system to detect processes that originated at the failed node and detect processes having care relationships to processes that originated at the failed node.

13. A computer program product as recited in claim 11 wherein the second computer readable program code devices are configured to cause a computer system to detect processes that were terminated by the failure of the failed node, and send messages to the processes and nodes having care relationships to the processes that were terminated by the failure of the failed node.

14. A computer program product as recited in claim 11 wherein the fifth computer readable program code devices are configured to cause a computer system to create a vproc structure for each process that originated at the failed node.

15. A computer program product as recited in claim 14 wherein the fifth computer readable program code devices are configured to cause a computer system to mark vproc structures created for processes terminated by the failure of the failed node as ghosts.

* * * * *